United States Patent

[11] 3,625,279

[72] Inventor Kenneth E. Mayo
Nashua, N.H.
[21] Appl. No. 858,344
[22] Filed Sept. 16, 1969
[45] Patented Dec. 7, 1971
[73] Assignee Sanders Associates, Inc.
Nashua, N.H.

[54] COMBINED HEATING AND COOLING SYSTEM
4 Claims, 1 Drawing Fig.
[52] U.S. Cl................................................ 165/62,
165/63, 165/64, 165/65, 165/108, 62/476
[51] Int. Cl.............................................. F25b 13/00
[50] Field of Search.................................. 165/46, 62,
63, 64, 65, 108; 62/259, 333, 476, 498 P, 3;
136/202

[56] References Cited
UNITED STATES PATENTS
2,546,912   3/1951   Sutton....................... 62/3 X
3,057,340  10/1962   Fritts......................... 62/3 UX
3,074,410   1/1963   Foster....................... 62/259 UX
3,285,534  11/1966   Wyatt....................... 136/202 X
3,316,732   5/1967   Burton....................... 62/259
3,432,386   3/1969   Fitzgerald et al........... 176/16
3,516,264   6/1970   Stierlin..................... 62/476 X Primary Examiner—William F. O'Dea
Assistant Examiner—P. D. Ferguson
Attorney—Louis Etlinger ABSTRACT: A combined heating and cooling system is provided which is particularly useful for flyers and astronauts. The system utilizes a self-contained heat source in combination with a conduit for carrying a heat transfer fluid. The conduit has first, second and third portions. A pump circulates the fluid in the conduit in a first direction, with the heat source positioned to heat the first portion of the conduit to a desired temperature. A second portion of the conduit is positioned adjacent a cooling means for cooling the fluid in the conduit and the third portion of the conduit is operatively positioned to heat or cool an object such as a flyer. Means are provided for controlling the temperature of the fluid in the third portion. Preferably the pump is actuated by a thermoelectric generator interconnected with the heat source. Preferably the means for controlling the temperature of the fluid in the third portion comprises bypass valves which permit the fluid to bypass the cooling means when desired.

PATENTED DEC 7 1971    3,625,279
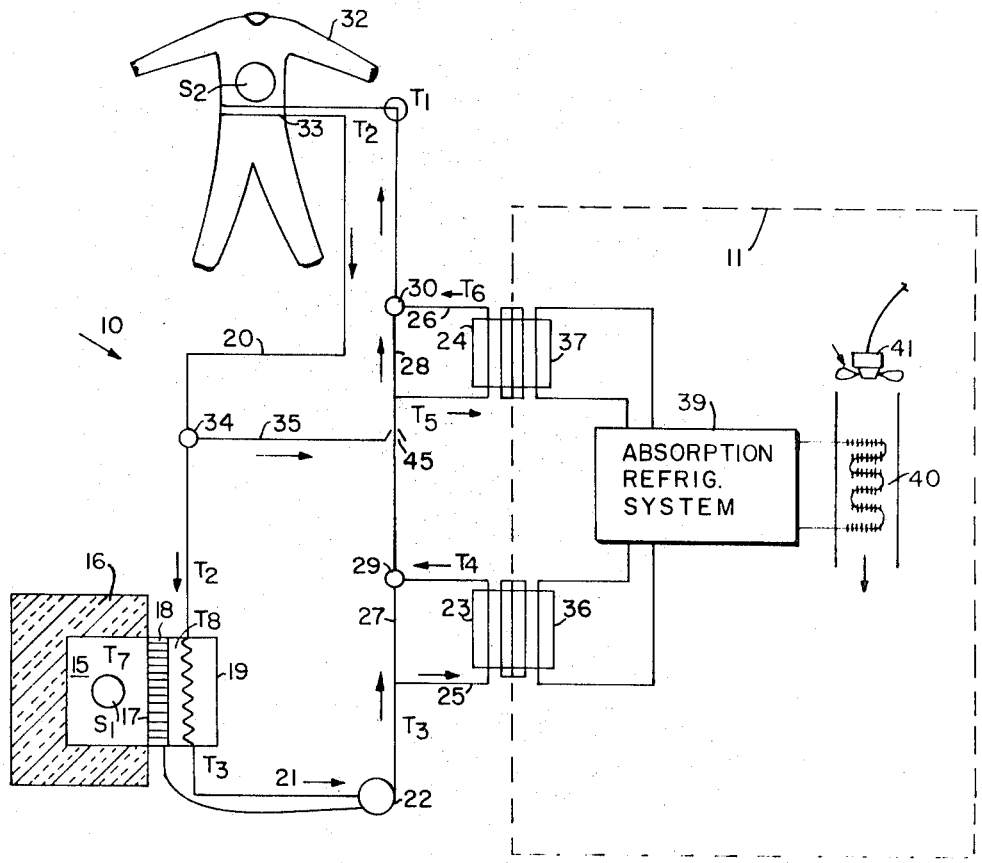
INVENTOR.
KENNETH E. MAYO
BY Richard J. Seligman
ATTORNEY

COMBINED HEATING AND COOLING SYSTEM

BACKGROUND OF THE INVENTION

Flyers and astronauts sometimes encounter extreme temperature conditions requiring body cooling while in an aircraft or spacecraft and body heating if ejection is required in cold environments. Various systems have been proposed for use including separate body cooling and separate body heating mechanisms.

It is an object of this invention to provide a novel and advantageous combined heating and cooling system particularly useful for flyers and astronauts.

It is another object of this invention to provide a combined heating and cooling system in accordance with the preceding object which can be operated with its own self-contained power supply and which automatically separates the heating system from the cooling system portions thereof upon suitable actuation.

SUMMARY OF THE INVENTION

A combined heating and cooling system which is particularly useful for flyers and astronauts comprises a self-contained heat source which is preferably a radioisotope heat source. Conduit means carry a heat transfer fluid and the conduit means define first, second and third portions. Means are provided for circulating the fluid in the conduit means in a first direction along a cyclic path. The heat source has a portion thereof positioned to heat the first portion of said conduit means whereby heat transfer fluid carried in the conduit means is heated to a desired temperature. The second portion of the conduit means is positioned adjacent a cooling means for cooling of the heat transfer fluid in the conduit means. The third portion of the conduit means is operatively positioned to heat or cool an object such as the body of a flyer. Means are provided for controlling the temperature of the heat transfer fluid in the third position of the conduit means.

Preferably the means for circulating the heat transfer fluid comprises a thermoelectric generator operated by the heat source to actuate a fluid-circulating pump operatively associated with the conduit means. Preferably the conduit means has a bypass for permitting fluid flow in predetermined amounts past said cooling means.

Preferably the heating and cooling system is self-contained and can be automatically ejected from an aircraft along with the user with the heating system intact and operative.

It is a feature of this invention that the combined heating and cooling system does not require auxiliary power supplies but has a self-contained power supply. The system can be used by the flyer or astronaut when ejecting from an aircraft without opening any circulating fluid lines within the conduit means, thus reducing hazards which include faulty valves, connectors or other malfunctioning equipment.

BRIEF DESCRIPTION OF THE DRAWINGS

The above and other objects, advantages and features of the present invention will be better understood from the following specification when read in connection with the accompanying drawing, in which the FIGURE is a semidiagrammatic view of a preferred embodiment of the combined heating and cooling system of this invention.

BRIEF DESCRIPTION OF PREFERRED EMBODIMENTS

Turning now to the preferred embodiment of the present invention, a combined heating and cooling system 10 is diagrammatically illustrated in the FIGURE for use in conjunction with a refrigerating system shown within the dotted outline 11. The refrigerating system normally forms a part of an aircraft. The entire heating and cooling system 10 is highly compact and can be carried on the body of the flyer or astronaut or on an ejection seat or other means normally ejected with the flyer from an aircraft when necessary.

The system 10 comprises a heat source 15 which is preferably a radioisotope source such as a thulium capsule having a cylindrical shape. The heat source is surrounded by insulation 16 to prevent heat transfer except in the preferred direction at a planar end 17 of the capsule which is positioned adjacent a thermoelectric generator 18. The thermoelectric generator is in turn positioned adjacent a heat exchanger 19 so that a predetermined amount of heat passes from the heat source through the thermoelectric generator to the heat exchanger 19.

A conduit means 20, formed of suitable pipe or flexible hosing, carries a heat transfer fluid circulating in a closed circuit in the direction of the arrows 21. The heat transfer fluid is preferably water of a water-alcohol or a water-ethylene glycol mixture although any safe fluid can be used. In a flyer application, safe fluids are those which would not endanger the health of a flyer in case of a leak in the conduit.

A first portion of the conduit passes through the heat exchanger 19 which heats the heat transfer fluid using heat derived from the heat source 15. A pump 22 is located in the conduit as shown in the FIGURE. The pump 22 is preferably an electrically operated pump which derives its power supply from the thermoelectric generator 18. Thus these is a constant pump power supply causing constant cycling of the heat transfer fluid about the system. A second portion of the conduit is formed by the heat exchangers 23 and 24 linked with conduit loops 25 and 26 respectively of the conduit. Loops 25 and 26 form loop bypass conduit portions 27 and 28 respectively. Conventional flow mixing valves 29 and 30 control fluid flow in the loops 25 and 26 respectively as will be described.

Temperature control points are indicated on the diagrammatic illustration at T1-T8. The conduit passes from flow mixing valve 30 to the suit 32 of the flyer which can be a conventional body temperature regulating suit. The conduit passes about the body in the suit and comes out of the suit at 33. The body of the flyer is considered a heat source and tends to add heat to the heat transfer fluid.

In the preferred embodiment, a third flow mixing valve 34 is used with a bypass conduit portion 35 as diagrammatically illustrated in the FIGURE. The bypass 35 and flow mixing valve 34 are useful to obtain lower temperatures than might otherwise be obtained as will be described.

The heat exchangers 23 and 24 are adapted to be releasably connected with or releasably positioned against corresponding heat exchange units 36 and 37 which form part of an aircraft. Conventional quick release mechanisms can be used to clamp the heat exchangers 23 and 24 in position and to release them upon ejection of the pilot.

Heat transfer devices 36 and 37 are portions of a refrigerating system which can be of various types. The well-known Electrolux-Servel refrigeration absorption cycle is preferred for use as diagrammatically illustrated in the FIGURE at 39. As clearly described in *Refrigeration and Air Conditioning*, Jordan, R. C. and Priester, G. B. 1948, Prentice-Hall, Inc. New York, pages 346–356, the Electrolux-Servel system comprises the heat exchangers 36 and 37 which act as a generator and evaporator respectively with fluid flow in a cycle past an absorber and condenser 40 associated with a fan mechanism 41.

Turning now to a description of the cycle of the heating and cooling system of this invention, heat from the source 15 is prevented from flow by insulation 16 except toward the thermoelectric generator 18 and heat exchanger 19. This causes the temperature T8 to be lower than the temperature T7 of the heat source while generating electricity at the thermoelectric generator which in turn constantly operates fluid pump 22. Insulation 16 is sufficient to assure that the temperature at the surface of the insulation is substantially that of the surrounding environment.

In the simplest form, the heat transfer fluid flows past heat exchanger 19 and is heated whereupon it is passed through loops 25 and/or 26 or through bypasses 37 and/or 28 and thence to the flyer's body through the suit 32 cycling back through the heat exchanger 19. It is important that the fluid flow easily without freezing at the lowest temperature excepted to be encountered and that the fluid remain in its original form without decomposing at the highest operational temperature.

It should be noted that as the heat transfer fluid leaves the pump 22, it can pass through the heat exchanger 23 or the bypass 27. Thus, the temperature of the fluid at T5 is determined by the mass fluid flow rate, the temperature of the fluid at T3 and the temperature of the fluid at reduced temperature T4 leaving the heat exchanger 23. Likewise at heat exchanger 24 the fluid at the temperature T5 is reduced to a temperature T6 as a function of the mass flow rates and temperatures of the respective fluid flow paths controlled by the mixing valve 30.

A temperature sensor can be placed in the fluid flow path of the conduit at T1 to control the temperature of the fluid entering the flyer's suit 32 by automatically regulating control valves 29 and 30 simultaneously to provide more or less fluid to bypass the two cooling heat exchangers 23 and 24. The highest temperature at T1 will occur when all fluid from pump 22 bypasses the heat exchangers and arrives at T1 at essentially temperature T3. The lowest temperature at T1 will occur when all fluid from pump 22 passes through both heat exchangers 23 and 24 and experiences maximum cooling. This explains the simplest arrangement of the conduit circuit without the use of the bypass 35.

The flyer can set a thermostat control at T1 which is connected with flow control valves 29 and 30 (to vary the amount of heat transfer fluid circulated through coolers 23 and 24) at a low temperature setting when he is in a hot environment such as the cockpit of a heated airplane. In a cold environment such as in Arctic waters or high altitude air after ejection from an aircraft, the flyer can set the thermostat to a position higher than body temperature to assure adequate heating. Manual controls can be used for valves 29, 30 and 34 or automatic controls such as a thermostat control can be used to determine fluid flow in the cooling heat exchangers 23 and 24.

In the preferred system which is useful to provide the lowest possible temperature at T1, bypass line 35 is used and actuated by means of flow control valve 34. An injector 45 is used into the conduit line between the heat exchanger portions of the loops 23 and 24. Suitable actuation of the valve 34 induces the bypass flow in the direction of the arrows shown adjacent line 35 and this increases the operating efficiency of the refrigerating system. Thus the bypass fluid dilutes the warmer fluid at the injector 45.

During flow through heat exchangers 23 and 24 heat is rejected to generator 36 at about 200° F. which in turn rejects heat to the environment through the absorber condenser 40 by the use of a forced air flow caused by fan 41.

In a specific example of this invention, the heat source is a 1,000 thermal watt thulium 170 and thulium 171 radioisotope heat source, shielded against radiation and heat loss by a layered tungsten shield and a thermal insulation of Min-K made by Johns Manville Co., and a fluid comprising a water-alcohol mixture in proportion of 50:50 is used. Generator 18 is a lead telluride thermoelectric generator with a fluid flow rate of 2 gal./min. and no flow through loops 25 and 26, a fluid temperature of 130° F. is easily obtained at T1 under standard environment temperature conditions (72° F.). When the flow pattern passes the fluid fully through the heat exchangers 23 and 24, a temperature of 75° F. at point T1 can be obtained. In the latter situation, employing bypass 35, a lower temperature at T1 can be obtained by tempering the fluid exiting valve 29 with fluid from valve 34 which has not been heated at heater 19 and thus providing greater separate control of the temperatures at 19 and heating garment 32. Such systems when sued for warming people in arctic regions commonly required about 1,000 W. for thermal energy delivered to the garment. Thermoelectric power sources of the type described commonly operate at a power conversion efficiency of 5 percent and in the future promise of reach 10 percent or better conversion efficiency. Thus, a system as described can provide from about 50 to over 100 watts of electric power to drive the required pumping equipment.

While specific embodiments of the present invention have been described and illustrated, it should be understood that many variations thereof are possible. Thus, while a lead telluride thermoelectric generator is preferred, various actuation means for causing fluid circulation can be used. The quick disconnects for separating the closed conduit system from the cooling system can vary greatly as known in the art. Similarly the specific lower pattern can change with addition of suitable valving systems. While it is preferred to utilize two heat exchangers 23 and 24 for cooling in conjunction with the absorption refrigeration system shown, one or more can be used with other refrigeration means.

What is claimed is:

1. A combination heating and cooling system comprising, a self-contained heat source,
   conduit means for carrying a heat transfer fluid and defining a first, a second and a third portion,
   means for circulating said fluid in a closed cycle in said conduit means in a first direction,
   said heat source having a portion thereof positioned to heat said first portion of said conduit means whereby fluid carried in said conduit means is heated to a desired temperature,
   said second portion of said conduit means being positioned adjacent a cooling means for cooling said fluid in said conduit means after said fluid is heated,
   said cooling means including an absorption refrigerator having a generator portion and an evaporator portion,
   said second portion of said conduit means comprising a first and second conduit loop, each of said loops carrying heat exchange means cooperatively coupled to said generator and evaporator portions respectively, conduit bypass means for said loops,
   said third portion of said conduit means being operatively positioned to heat or cool an object,
   bypass means extending from a point in said conduit means before said first portion to a point in said conduit means before said third portion,
   and means for controlling the temperature of said fluid in said third portion.

2. A combination heating and cooling system in accordance with claim 1 wherein said means for controlling the temperature of said fluid comprises valve means for permitting predetermined fluid flow in said conduit loops adjacent said generator and evaporator portions,
   said system being designed to heat or cool an individual and being readily separated form said cooling means.

3. A combination heating and cooling system in accordance with claim 2 wherein said circulating means comprises a thermoelectric generator operatively associated with said heat source and interconnected with a fluid pump for continuously circulating said heat transfer fluid.

4. A combination heating and cooling system in accordance with claim 3 wherein said heat source is a radioisotopic material and said thermoelectric generator is positioned between said first portion and said heat source.

* * * * *